(12) United States Patent
Jordan (10) Patent No.: US 8,464,844 B2
(45) Date of Patent: Jun. 18, 2013

(54) HYDRAULIC BRAKE LEVER

(75) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 388 days.

(21) Appl. No.: 12/979,599

(22) Filed: Dec. 28, 2010

(65) Prior Publication Data
US 2012/0160625 A1 Jun. 28, 2012

(51) Int. Cl.
*B60L 3/00* (2006.01)

(52) U.S. Cl.
USPC .......................... 188/24.22; 188/344

(58) Field of Classification Search
USPC ........... 188/24.22, 24.11, 344; 74/489, 502.2, 74/471 XY, 479.01, 488, 18.2, 81, 82
See application file for complete search history.

(56) References Cited

U.S. PATENT DOCUMENTS

| | | | |
|---|---|---|---|
| 3,742,777 A * | 7/1973 | Mathauser | 474/81 |
| 6,647,823 B2 | 11/2003 | Tsumiyama et al. | |
| 7,124,873 B2 | 10/2006 | Tsumiyama | |
| 7,578,375 B2 * | 8/2009 | Lin et al. | 188/344 |
| 7,757,488 B2 | 7/2010 | Dunlap, III | |
| 7,779,718 B2 | 8/2010 | Jordan et al. | |
| 8,146,716 B2 * | 4/2012 | Siew et al. | 188/24.22 |
| 2005/0056508 A1 * | 3/2005 | Laghi | 188/344 |
| 2006/0207375 A1 | 9/2006 | Jordan et al. | |
| 2010/0083788 A1 | 4/2010 | Jordan et al. | |
| 2010/0199798 A1 | 8/2010 | Uno | |

OTHER PUBLICATIONS

Magura HS 66 and 77 Hydraulic Road Brake document, dated at least as early as Jan. 1, 2008.

* cited by examiner

*Primary Examiner* — Melanie Torres Williams
(74) *Attorney, Agent, or Firm* — Milan Milosevic; Lisa Serdynski; Steven Courtright (57) ABSTRACT

A control assembly is mountable to a handlebar. The control assembly features a housing mountable to the handlebar and a brake actuation mechanism including a brake lever pivotally connected to a housing. The brake lever defines a fluid cavity inside the brake lever such that the fluid cavity pivots with the lever relative to the housing. A piston is provided in the fluid cavity and also pivots with the lever relative to the housing. Actuation of the lever causes the piston to move in the fluid cavity to provide compressive force to a fluid. The fluid cavity is in fluid communication with a hydraulic line.

19 Claims, 6 Drawing Sheets

HYDRAULIC BRAKE LEVER

FIELD OF INVENTION

Some embodiments generally relate to an actuation lever used in a hydraulic system. More particularly, some embodiments relate to a brake lever used with a hydraulic braking system that brakes a wheel of a vehicle, such as for example, a bicycle.

DESCRIPTION OF RELATED ART

Many vehicles, such as for example bicycles, utilize a braking system that applies pressure to a rotating wheel, or a disc mounted to a rotating wheel. Some of these braking systems utilize a control assembly such as a hand lever, to provide pressure on to a hydraulic fluid. This pressure is transferred through a hydraulic line or conduit to a brake assembly, which may include a caliper having pads, such that the hydraulic pressure is applied to the pads to squeeze the pads against the rotating part to impart a braking force.

SUMMARY OF THE INVENTION

In light of the present need for an improved hydraulic brake actuation mechanism, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In one aspect of some embodiments, there is provided a control assembly mountable to a handlebar, the control assembly comprising: a housing mountable to the handlebar; and a brake actuation mechanism including a brake lever pivotally connected to a housing and defining a fluid cavity therein such that the fluid cavity pivots with the lever relative to the housing.

In another aspect of some embodiments, there is provided a control assembly mountable to a handlebar, the control assembly comprising: actuating means for actuating a brake; fluid compressing means for compressing fluid disposed inside the actuating means; and mounting means for mounting the actuating means and the fluid compressing means to the handlebar for movement of the actuating means and the fluid compressing means together relative to the handlebar.

BRIEF DESCRIPTION OF THE DRAWINGS

In order to better understand various exemplary embodiments, reference is made to the accompanying drawings, wherein.

DETAILED DESCRIPTION

Various embodiments of the invention provide for an improved control assembly including a brake actuation mechanism, which may in some cases include another component such as, for example, a shift actuation mechanism. The control assembly described herein is well suited for use in handlebar-steered vehicles such as, for example, bicycles. Some embodiments will now be described further below, with reference to the drawing figures.

Figure 1:
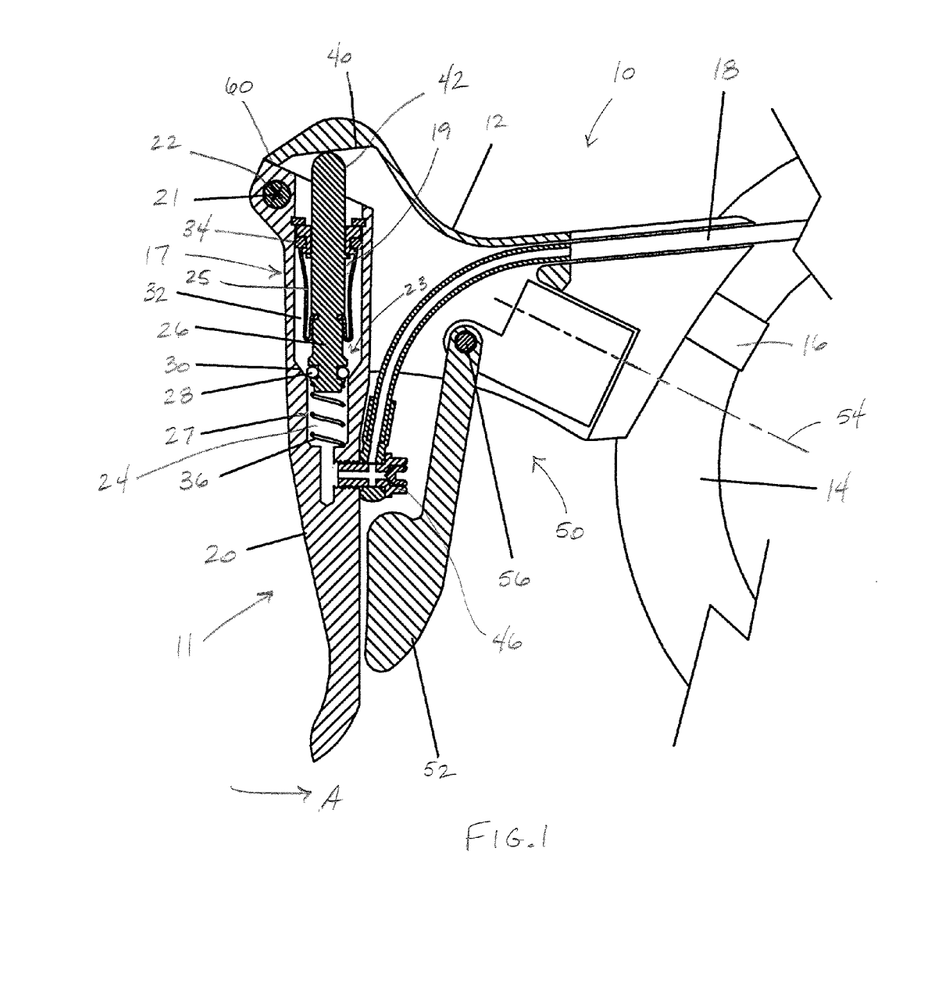
FIG. 1 is a cross-sectional view showing a control assembly including a brake actuation mechanism and a shift actuation mechanism according to a first embodiment of the present invention.
Figure 2:
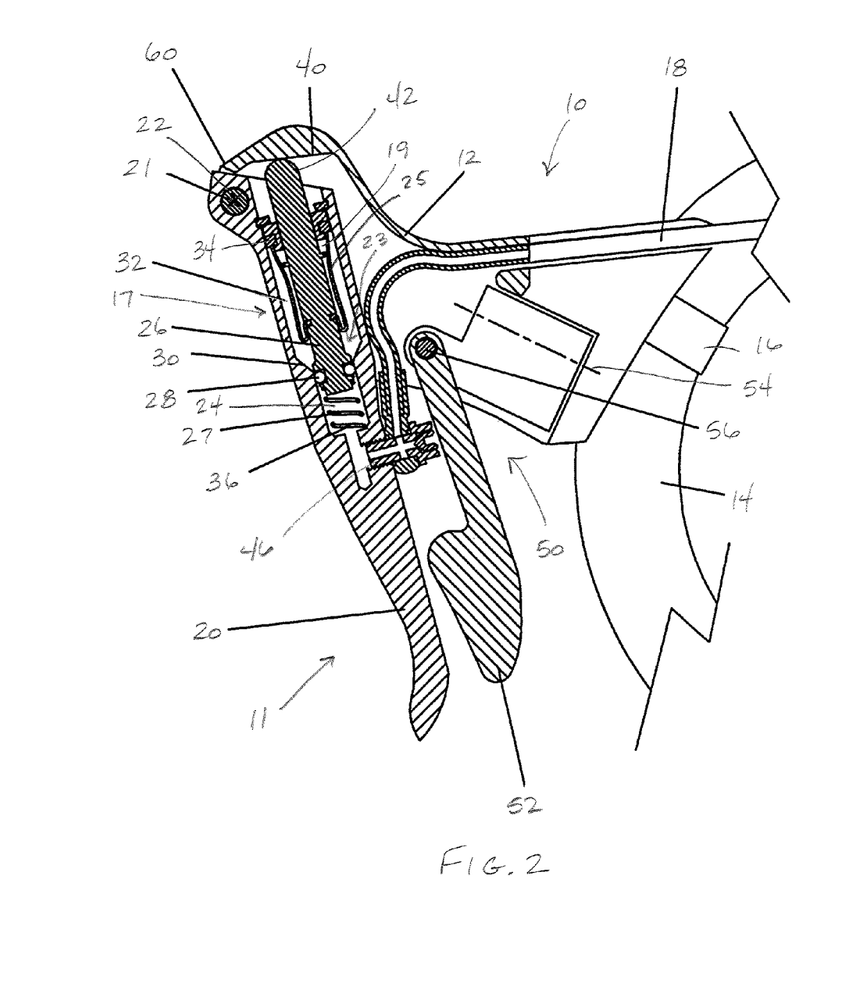
FIG. 2 is a cross-sectional view of the control assembly of FIG. 1 showing a brake lever in a brake actuated position.

As seen in FIGS. 1 and 2, a control assembly 10 is shown according to a first embodiment. The control assembly 10 includes a housing 12 mounted to a handlebar 14 by a clamp 16 and a brake actuation mechanism 11. A hydraulic line 18 provides a hydraulic conduit that extends to the wheel brake or other hydraulic component being actuated. In one example, the hydraulic line 18 leads to a front or rear wheel brake of a bicycle.

The brake actuation mechanism 11 includes a brake lever 20 pivotally mounted to the housing 12 by a brake pivot element 22, such as for example a pin or a hinge. The pin or hinge mounting arrangement allows the brake lever 20 to pivot about an axis 21 also designated as the center line of the pivot element 22. The brake lever 20 has defined in its interior a chamber 17 including an air cavity 19 and a fluid cavity 23, which is adapted to retain brake fluid. A flexible bladder 25 sealingly separates the air cavity 19 from the fluid cavity 23. The fluid cavity 23 includes first and second fluid cavity regions 24, 32 and a tapered transitional region 30 therebetween. A piston 26 is mounted for reciprocating motion within the fluid cavity 23 between an open fluid circuit position that permits fluid flow between the first and second fluid cavity regions 24, 32 and a closed fluid circuit position that blocks fluid flow between the first and second fluid cavity regions 24, 32. A first seal 28, in this embodiment a O-ring, is disposed on a first end portion of the piston 26 which sealingly engages a fluid cavity wall 27 of the first fluid cavity region 24 to block fluid flow between the first and second fluid cavity regions 24, 32. One end of the first fluid cavity region 24 is in fluid communication with the hydraulic line 18 and the other end of the first fluid cavity region 24 is adjacent the tapered transitional region 30. The second fluid cavity region 32 is defined on the other side of the first seal 28. The second fluid cavity region 32 functions as a reservoir and is sealed by a second seal 34 as shown which provides a seal between the piston 26 and the second fluid cavity region 32. A return spring 36 is disposed in the first fluid cavity region 24 to bias the piston 26 in a rest position, shown as upward in FIG. 1. It will be appreciated when comparing FIGS. 1 and 2 that manual application of the brake lever 20 in the direction A towards the handlebar 14 will cause the piston 26 to move to a deflected position relative to the first fluid cavity region 24, shown as downward in FIG. 2, and the piston 26 and the first fluid cavity region 24 to move rearward toward the handlebar 14 along with the brake lever 20.

The housing 12 has an interior cavity that defines a brake actuating surface 40. The piston 26 has a curved second end portion 42 that is capable of sliding contact with the brake actuating surface 40. Thus, it will be appreciated that as the brake lever 20 moves toward the handlebar 14, the piston 26 moves into the first fluid cavity region 24 causing the first seal 28 to sealingly engage the wall of the first fluid cavity region 24, thereby blocking fluid flow between the first and second fluid cavity regions 24, 32. This blockage builds pressure in the first fluid cavity region 24, and in turn, forces pressurized fluid through an outlet port 46 defined at the lower end of the first fluid cavity region 24. In the illustrated example, the outlet port 46 is provided as a fitting that is mounted into the brake lever 20 so that the fluid passes through the outlet fitting 46 and into a hydraulic line 18 that is sealed at one end with respect to the fitting 46. Manual force applied to the brake lever 20 causes the piston 26 to be urged into the first fluid cavity region 24, thus providing the fluid pressure through the outlet fitting 46 and into the hydraulic line 18 to the brake or other device that is being hydraulically actuated. When manual pressure is released from the brake lever 20 the biasing force from the return spring 36 will cause the lever 20 to return to its rest position as shown in FIG. 1, wherein the first seal 28 is in non-sealing disengagement between the fluid cavity wall 27 and the piston 26 with the piston 26 in the open fluid circuit position to permit fluid flow between the first and second fluid cavity regions 24, 32.

FIGS. 1 and 2 also show the brake actuation mechanism 11 utilized in connection with another component mounted to the housing 12 such as for example an optional shift actuation mechanism 50. The shift actuation mechanism 50 in this example is used to shift gears in the bicycle and is mounted partially inside the housing 12. In one example, the shift actuation mechanism may be a control mechanism such as that described in U.S. Pat. No. 7,779,718, the disclosure of which is hereby incorporated by reference in its entirety. The shift actuation mechanism 50 includes a shift lever 52 that pivots about a pivot pin 56 to accommodate pivoting of the brake lever 20. The shift lever 52 also pivots about a shift axis 54 to effect shifting. A step 60 is provided on the housing 12 to limit the travel range of the brake lever 20 in the outward direction.

The embodiments in FIGS. 1 and 2 depict a fluid cavity 23 that is provided inside a pivoting brake lever 20 and a piston 26 that is moveably disposed in the fluid cavity 23 such that actuation of the brake lever 20 causes one end 42 of the piston 26 to contact a portion 40 of an adjacent housing 12 to move the piston 20 in the cavity 23 and thereby apply pressure to the brake fluid in a first fluid cavity region 24 of the fluid cavity 23. Further, an outlet 46 is provided through the brake lever 20 itself to permit brake fluid to flow from the first fluid cavity region 24 outwardly into a hydraulic line 18.

Figure 3:
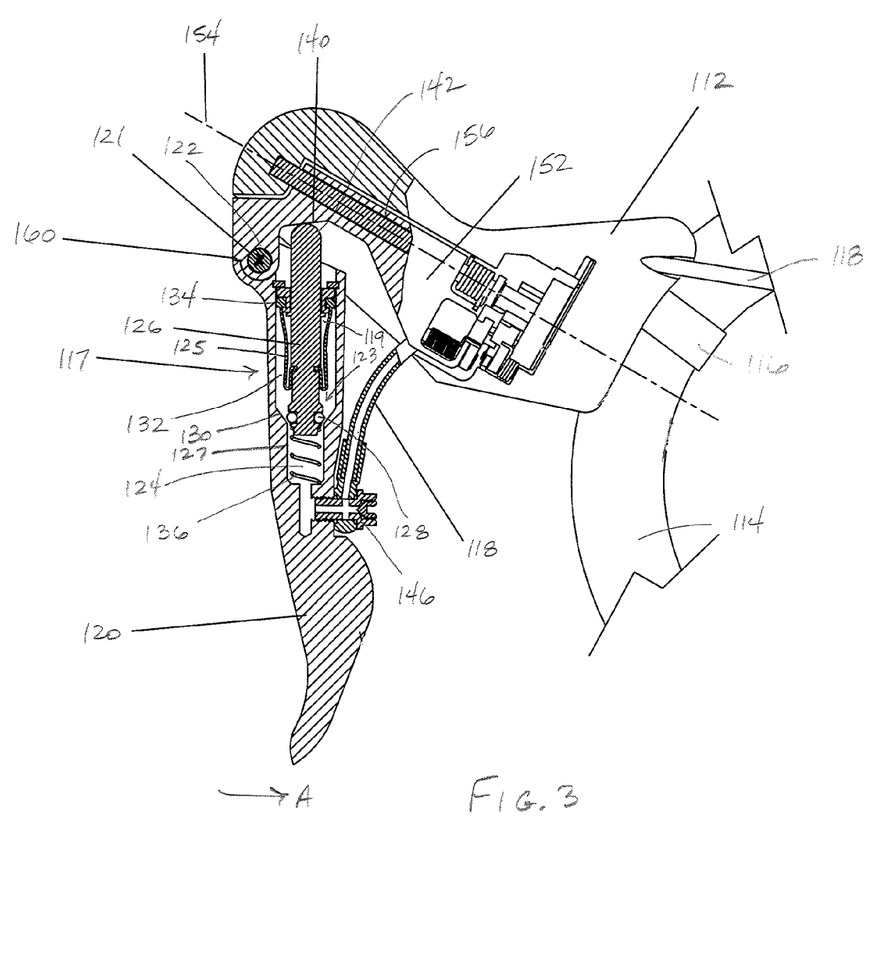
FIG. 3 is a cross-sectional view of a control assembly including a brake actuation mechanism and a shift actuation mechanism according to a second embodiment of the present invention.

As seen in FIG. 3, a control assembly 110 is shown, according to a second embodiment. The control assembly 110 includes a housing 112 mounted to a handlebar 114 by a clamp 116 and a brake actuation mechanism 111. A hydraulic line 118 provides a hydraulic conduit that extends to the wheel brake or other hydraulic component being actuated. In one example, the hydraulic line 118 leads to a front or rear wheel brake of a bicycle.

The brake actuation mechanism 111 includes a brake lever 120 pivotally mounted indirectly to the housing 112 by a brake pivot element 122, such as for example a pin or a hinge. The indirect mounting of the brake lever 120 is related to a type of shift actuation mechanism used in this embodiment which is described in more detail below. The pin or hinge mounting arrangement allows the brake lever 120 to pivot about an axis 121 also designated as the center line of the pivot element 122. The brake lever 120 has defined in its interior a chamber 117 including an air cavity 119 and a fluid cavity 123, which is adapted to retain brake fluid. A flexible bladder 125 sealingly separates the air cavity 119 from the fluid cavity 123. The fluid cavity 123 includes first and second fluid cavity regions 124, 132 and a tapered transitional region 130 therebetween. A piston 126 is mounted for reciprocating motion within the fluid cavity 123 between an open fluid circuit position that permits fluid flow between the first and second fluid cavity regions 124, 132 and a closed fluid circuit position that blocks fluid flow between the first and second fluid cavity regions 124, 132. A first seal 128, in this embodiment a O-ring, is disposed on a first end portion of the piston 126 which sealingly engages a fluid cavity wall 127 of the first fluid cavity region 124 to block fluid flow between the first and second fluid cavity regions 24, 32. One end of the first fluid cavity region 124 is in fluid communication with the hydraulic line 118 and the other end of the first fluid cavity region 124 is adjacent the tapered transitional region 30. The second fluid cavity region 132 is defined on the other side of the first seal 128. The second fluid cavity region 132 functions as a reservoir and is sealed by a second seal 134 as shown which provides a seal between the piston 126 and the second fluid cavity region 132. A return spring 136 is disposed in the first fluid cavity region 124 to bias the piston 126 in a rest position, shown as upward in FIG. 1. In this embodiment, manual application of the brake lever 120 in the direction A towards the handlebar 114 will cause the piston 126 to a deflected position relative to the first fluid cavity region 124 (generally similar to the process shown in FIG. 2), and the piston 126 and first fluid cavity region 124 to move rearward toward the handlebar 114 along with the brake lever 120.

As described in more detail below, a brake actuating surface 140 is provided as shown. The piston 126 has a curved second end portion 142 that is capable of sliding contact with the brake actuating surface 140. Thus, it will be appreciated that as the brake lever 120 moves toward the handlebar 114, the piston 126 moves into the first fluid cavity region 124 causing the first seal 128 to sealingly engage the wall of the first fluid cavity region 124, thereby blocking fluid flow between the first and second fluid cavity regions 124, 132. This blockage builds pressure in the first fluid cavity region 24, and in turn, forces pressurized fluid through an outlet port 146 defined at the lower end of the cavity 124. In the illustrated example, the outlet port 146 is provided as a fitting that is mounted into the brake lever 120 so that the fluid passes through the outlet fitting 146 and into the hydraulic line 118 that is sealed at one end with respect to the fitting 146. Manual force applied to the brake lever 120 causes the piston 126 to be urged into the first fluid cavity region 124, thus providing the fluid pressure through the outlet fitting 146 and into the hydraulic line 118 to the brake or other device that is being hydraulically actuated. When manual pressure is released from the brake lever 120 the biasing force from the return spring 136 will cause the brake lever 120 to return to its rest position as shown in FIG. 3, wherein the first seal 128 is in non-sealing disengagement between the fluid cavity wall 127 and the piston 126 with the piston 126 in the open fluid circuit position to permit fluid flow between the first and second fluid cavity regions 124, 132.

FIG. 3 also shows the brake actuation mechanism 111 utilized in connection with another component mounted to the housing 112 such as for example an optional shift actuation mechanism 150. The shift actuation mechanism 150 in this example is used to shift gears in the bicycle and is mounted partially inside the housing 112 but also includes a shift bracket 152, which is pivotally mounted relative to the housing 112 by a pivot hinge 156. The brake lever 120 is mounted to the shift bracket 152 so that the brake lever can be manually pivoted around a shift axis 154, thus also pivoting the shift bracket 152 to effect shifting. In one example, the shift mechanism may be a control mechanism such as that described in U.S. Patent Application Publication No. US 2010/0083788, the disclosure of which is hereby incorporated by reference in its entirety. The shift actuation mechanism 150 uses the braker lever 120 to also pivot the shift bracket 152 so that it pivots about the pivot pin axis 154 to effect shifting. The brake actuating surface 140 in this embodiment is provided as an interior surface of the shift bracket 152. A step 160 is provided on the shift bracket 112 to limit the travel range of the brake lever 120 in the outward direction.

FIG. 3 thus depicts a fluid cavity 123 that is provided inside a pivoting brake lever 120 and a piston 126 that is moveably disposed in the fluid cavity 123 such that actuation of the brake lever 120 causes one end 142 of the piston 126 to contact a portion 140 of an adjacent shift bracket 152 to move the piston 120 in the first fluid cavity region 124 and thereby apply pressure to the brake fluid in a first fluid cavity region 124 of the fluid cavity 123. Further, an outlet 146 is provided through the brake lever 120 itself to permit brake fluid to flow from the first fluid cavity region 124 outwardly into a hydraulic line 118.

Figure 4:
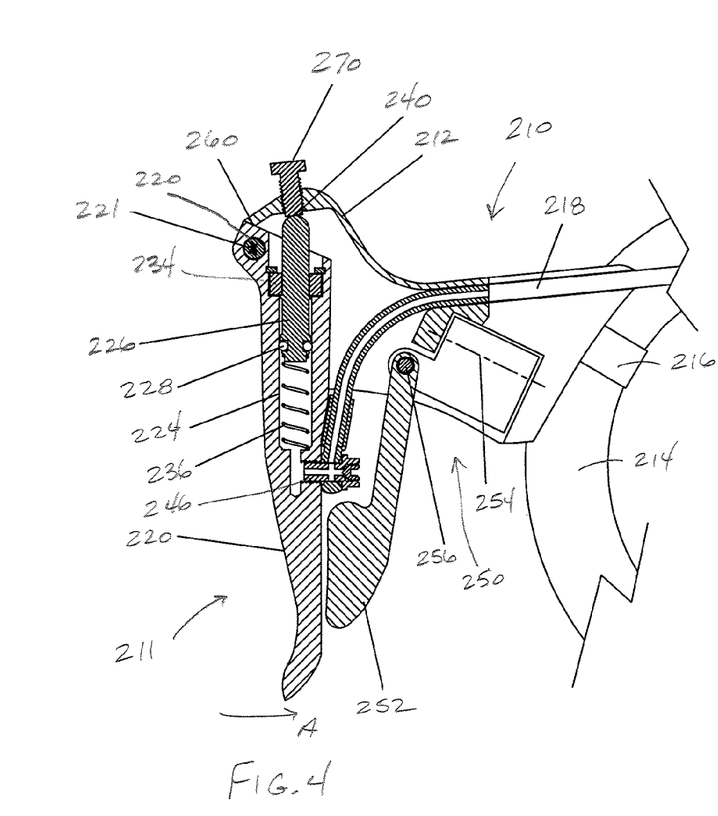
FIG. 4 is a cross-sectional view of a control assembly including a brake actuation mechanism and a shift actuation mechanism according to a third embodiment of the present invention.
Figure 5:
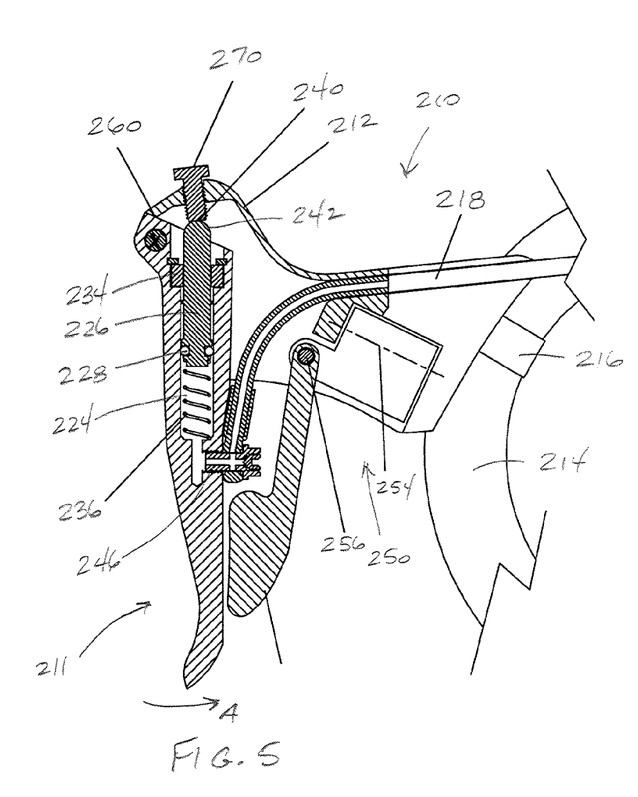
FIG. 5 is a cross-sectional view of the control assembly of FIG. 4 showing a piston of the brake actuation mechanism in a different rest position than shown in FIG. 4.

As seen in FIGS. 4 and 5, a control assembly 210 is shown, according to a third embodiment. The control assembly 210 includes a housing 212 mounted to a handlebar 214 by a clamp 216 and a brake actuation mechanism 211. A hydraulic line 218 provides a hydraulic conduit that extends to the wheel brake or other hydraulic component being actuated. In one example, the hydraulic line 218 leads to a front or rear wheel brake of a bicycle.

The brake actuation mechanism 211 includes a brake lever 220 pivotally mounted to the housing 212 by a brake pivot element 222, such as for example a pin or a hinge. The pin or hinge mounting arrangement allows the brake lever 220 to pivot about an axis 221 also designated as the center line of the pivot element 222. The brake lever 220 has defined in its interior a fluid cavity 224, which is adapted to retain brake fluid. A piston 226 is mounted for reciprocating motion relative to the cavity 224 and has a piston seal 228 such as an O-ring which seals against the inside of the cavity 224 and thereby defines a contained fluid region. A return spring 36 is disposed in the cavity 224 to bias the piston 226 in a rest position, shown as upward in FIGS. 4 and 5.

The housing 212 has an interior cavity that supports a threadably adjustable adjuster screw 270 for adjusting the fluid volume within the fluid cavity 224. The adjuster screw 270 includes a brake actuating surface 240. Other adjustable surfaces such as cams or other adjusters can be used to adjust the contact location of a curved piston end 242 that is capable of sliding contact with the brake actuating surface 240. This embodiment does not have a fluid reservoir but by rotating the adjuster screw 270, causing the piston to move in or out of the fluid cavity 224 (see FIGS. 4 and 5), the fluid volume of the fluid cavity 224 may be adjusted. Thus, it will be appreciated that movement of the brake lever 220 towards the handlebar 214 effectively compresses the piston 226 into the cavity 224. This compression tends to force fluid through an outlet port 246 defined at a lower end of the cavity 224. In the illustrated example, the outlet port 246 is provided as a fitting that is mounted into the brake lever 220 so that the fluid passes through the outlet fitting 246 and into the hydraulic line 218. Manual force applied to the brake lever 220 causes the piston 226 to be urged into the cavity 224, thus providing the fluid pressure through the outlet fitting 246 and into the hydraulic line 218 to the brake or other device that is being hydraulically actuated. When manual pressure is released from the brake lever 220 the biasing force from the return spring 236 will cause the lever 220 to return to its rest position as shown in FIGS. 4 and 5.

FIGS. 4 and 5 also show the brake lever 220 utilized in connection with another component mounted to the housing such as for example an optional shift actuation mechanism 250. The shift actuation mechanism 250 in this example is used to shift gears in the bicycle and is mounted partially inside the housing 212. In one example, the shift actuation mechanism may be a control mechanism such as that described in U.S. Pat. No. 7,779,718, the disclosure of which is hereby incorporated by reference in its entirety. The shift actuation mechanism 250 includes a shift lever 252 that pivots about a pivot pin 256 to accommodate pivoting of the brake lever 220. The shift lever 252 also pivots about a shift axis 254 to effect shifting. A step 260 is provided on the housing 212 to limit the travel range of the brake lever 220 in the outward direction.

The embodiments in FIGS. 4 and 5 depict a fluid cavity 224 that is provided inside a pivoting brake lever 220 and a piston 226 that is moveably disposed in the fluid cavity 224 such that actuation of the brake lever 220 causes one end 242 of the piston 226 to contact a portion 240 of an adjacent housing 212 to move the piston 220 in the fluid cavity 224 and thereby apply pressure to the brake fluid in the fluid cavity 224. Further, an outlet 246 is provided through the brake lever 220 itself to permit brake fluid to flow from the first fluid cavity region 224 outwardly into a hydraulic line 218.

Figure 6:
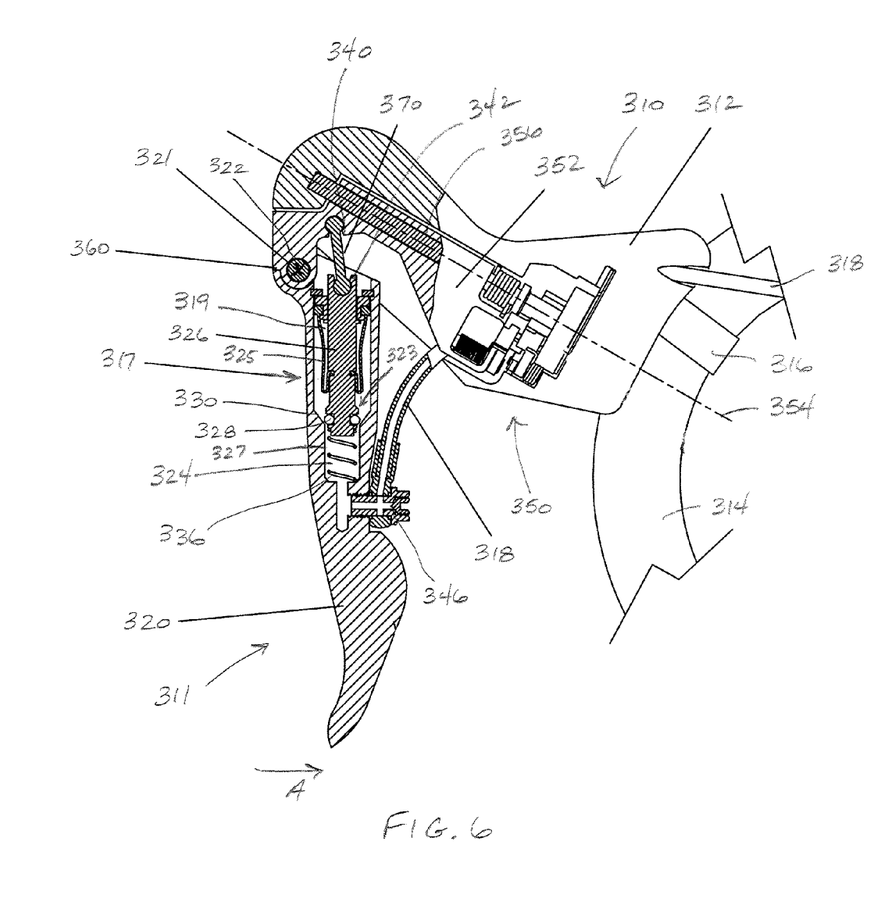
FIG. 6 is a cross-sectional view of a control assembly including a brake actuation mechanism and a shift actuation mechanism according to a fourth embodiment of the present invention.

As seen in FIG. 6, a control assembly 310 is shown, according to a fourth embodiment. The control assembly 310 includes a housing 312 mounted to a handlebar 314 by a clamp 316 and a brake actuation mechanism 311. A hydraulic line 318 provides a hydraulic conduit that extends to the wheel brake or other hydraulic component being actuated. In one example, the hydraulic line 318 leads to a front or rear wheel brake of a bicycle.

The brake actuation mechanism 311 includes a brake lever 320 is pivotally mounted indirectly to the housing 312 by a brake pivot element 322, such as for example a pin or a hinge. The indirect mounting of the brake lever 320 is related to a type of shift actuation mechanism used in this embodiment which is described in more detail below. The pin or hinge mounting arrangement allows the brake lever 320 to pivot about an axis 321 also designated as the center line of the pivot element 322. The brake lever 320 has defined in its interior a chamber 317 including an air cavity 319 and a fluid cavity 323, which is adapted to retain brake fluid. A flexible bladder 325 sealingly separates the air cavity 319 from the fluid cavity 323. The fluid cavity 323 includes first and second fluid cavity regions 324, 332 and a tapered transitional region 230 therebetween. A piston 326 is mounted for reciprocating motion within the fluid cavity 323 between an open fluid circuit position that permits fluid flow between the first and second fluid cavity regions 324, 332 and a closed fluid circuit position that blocks fluid flow between the first and second fluid cavity regions 324, 332. A first seal 328, in this embodiment a O-ring, is disposed on a first end portion of the piston 326 which sealingly engages a fluid cavity wall 327 of the first fluid cavity region 324 to block fluid flow between the first and second fluid cavity regions 324, 332. One end of the first fluid cavity region 324 is in fluid communication with the hydraulic line 18 and the other end of the first fluid cavity region 324 is adjacent the tapered transitional region 330. The second fluid cavity region 332 is defined on other side of the first seal 328. The second fluid cavity region 332 functions as a reservoir and is sealed by a second seal 334 as shown, which provides a seal between the piston 126 and the second fluid cavity region 332. A return spring 336 is disposed in the first fluid cavity region 324 to bias the piston 326 in a rest position, shown as upward in FIG. 6. In this embodiment, manual application of the brake lever 320 in the direction A towards the handlebar 314 will cause the piston 326 to move to a deflected position relative to the first fluid cavity region 324 (generally similar to the process shown in FIG. 2), and the piston 326 and first fluid cavity region 324 to move rearward toward the handlebar 314 along with the brake lever 320.

As described in more detail below, a brake actuating link 370 is provided as shown. The link 370 is connected at one end to the piston 326 and at another end to a shift bracket 352 of a shift actuation mechanism 350 mounted to the housing as explained further below. Thus, it will be appreciated that as the brake lever 320 moves toward the handlebar 314, the piston 326 moves into the first fluid cavity region 324 causing the first seal 328 to sealingly engage the wall of the first fluid cavity region 324, thereby blocking fluid flow between the first and second fluid cavity regions 324, 332. This blockage builds pressure in the first fluid cavity region 324, and in turn, forces pressurized fluid through an outlet port 346 defined at the lower end of the first fluid cavity region 324. In the illustrated example, the outlet port 346 is provided as a fitting that is mounted into the brake lever 320 so that the fluid passes through the outlet fitting 346 and into the hydraulic line 318. Manual force applied to the brake lever 320 causes the piston 326 to be urged into the first fluid cavity region 324, thus providing the fluid pressure through the outlet fitting 346 and into the hydraulic line 318 to the brake or other device that is being hydraulically actuated. When manual pressure is released from the brake lever 320 the biasing force from the return spring 336 will cause the brake lever 320 to return to its rest position as shown in FIG. 6, wherein the first seal 328 is in non-sealing disengagement between the fluid cavity wall and the piston 326 with the piston 326 in the open fluid circuit position permitting fluid flow between the first and second fluid cavity regions 324, 332.

FIG. 6 also shows the brake lever 320 utilized in connection with another component mounted to the housing 312 such as for example an optional shift actuation mechanism 350. The shift actuation mechanism 350 in this example is used to shift gears in the bicycle and is mounted partially inside the housing 312 but also includes a shift bracket 352, which is pivotally mounted relative to the housing 312 by a pivot hinge 356. The brake lever 320 is mounted to the shift bracket 352 so that the brake lever can be manually pivoted around a shift axis 354, thus also pivoting the shift bracket 352 to effect shifting. In one example, the shift actuation mechanism 350 may be a control mechanism such as that described in U.S. Patent Application Publication No. US 2010/0083788, the disclosure of which is hereby incorporated by reference in its entirety. The shift actuation mechanism 350 uses the braker lever 320 to also pivot the shift bracket 352 so that it pivots about the pivot pin axis 354 to effect shifting. The shift link 370 in this embodiment is connected at one end to the piston 326 and at its other end to the shift bracket 352, serving a function generally similar to the actuation surface 40, but using a pivoting link connection. A step 360 is provided on the shift bracket 352 to limit the travel range of the brake lever 320 in the outward direction.

FIG. 6 thus depicts a fluid cavity 323 that is provided inside a pivoting brake lever 320 and a piston 326 that is moveably disposed in the cavity 323 such that actuation of the brake lever 320 causes one end 342 of the piston 326 to contact a portion 340 of an adjacent shift bracket 352 to move the piston 326 in a first fluid cavity region 324 of the fluid cavity 323 and thereby apply pressure to the brake fluid in the first fluid cavity region 324. Further, an outlet 346 is provided through the brake lever 320 itself to permit brake fluid to flow from the first fluid cavity region 324 outwardly into a hydraulic line 318.

Figure 7:
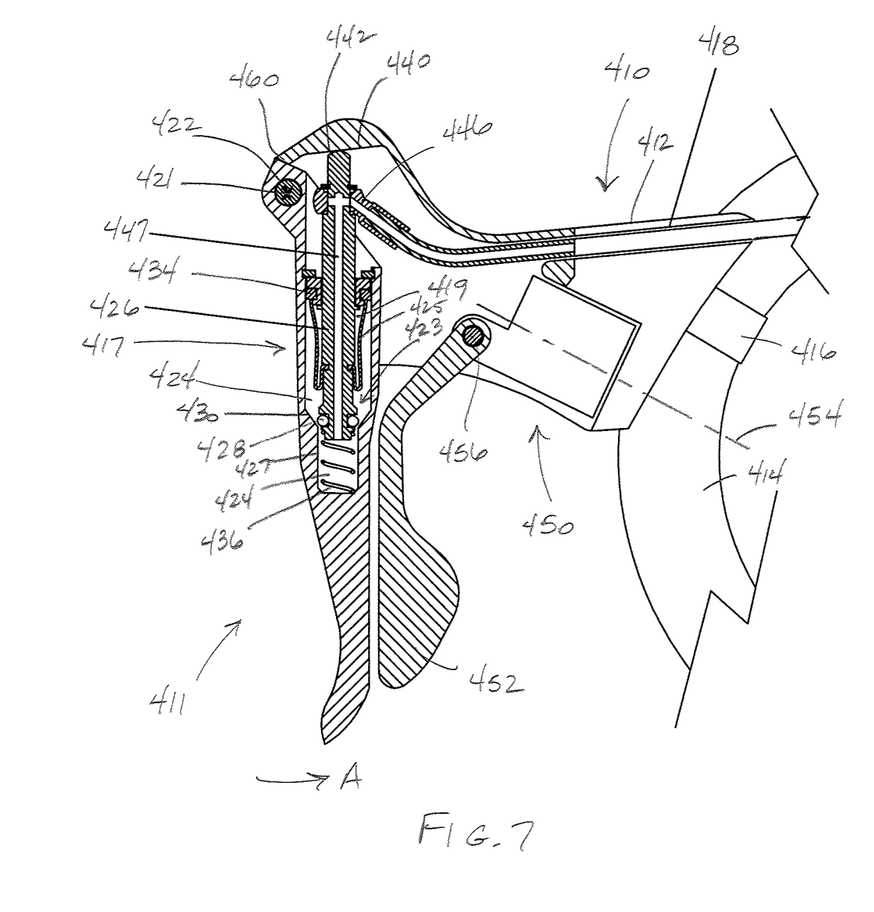
FIG. 7 is a cross-sectional view of a control assembly including a brake actuation mechanism and a shift actuation mechanism according to a fifth embodiment of the present invention.

As seen in FIG. 7, a control assembly 10 is shown, according to a fifth embodiment. The control assembly 410 includes a housing 412 mounted to a handlebar 414 by a clamp 416 and a brake actuation mechanism 411. A hydraulic line 418 provides a hydraulic conduit that extends to the wheel brake or other hydraulic component being actuated. In one example, the hydraulic line 418 leads to a front or rear wheel brake of a bicycle.

The brake actuation mechanism 411 includes a brake lever 420 pivotally mounted to the housing 412 by a brake pivot element 422, such as for example a pin or a hinge. The pin or hinge mounting arrangement allows the brake lever 420 to pivot about an axis 421 also designated as the center line of the pivot element 422. The brake lever 420 has defined in its interior a chamber 417 including an air cavity 419 and a fluid cavity 423 which is adapted to retain brake fluid. A flexible bladder 425 sealingly separates the air cavity 419 from the fluid cavity 423. The fluid cavity 423 includes first and second fluid cavity regions 424, 432 and a tapered transitional region 430 therebetween. A piston 426 is mounted for reciprocating motion within the fluid cavity 423 between an open fluid circuit position that permits fluid flow between the first and second fluid cavity regions 424, 432 and a closed fluid circuit position that blocks fluid flow between the first and second fluid cavity regions 424, 432. A first seal 428, in this embodiment a O-ring, is disposed on a first end portion of the piston 426 which sealingly engages a fluid cavity wall 427 of the first fluid cavity region 424 to block fluid flow between the first and second fluid cavity regions 424, 432. One end of the first fluid cavity region 424 is in fluid communication with the hydraulic line 418 and the other end of the first fluid cavity region 424 is adjacent the tapered transitional region 430. The second fluid cavity region 432 is defined on the other side of the first seal 428. The second fluid cavity region 432 functions as a reservoir and is sealed by a second seal 434 as shown, which provides a seal between the piston 426 and the second fluid cavity region 432. A return spring 436 is disposed in the cavity 424 to bias the piston 426 in a rest position, shown as upward in FIG. 7. It will be appreciated from FIG. 7 that manual application of the brake lever 20 in the direction A towards the handlebar 414 will cause the piston 426 to move to a deflected position relative to the first fluid cavity region 424 and the piston 426 and first fluid cavity region 424 to move rearward toward the handlebar 414 along with the brake lever 420.

The housing 412 has an interior cavity that defines a brake actuating surface 440. The piston 426 has a curved end portion 442 that is capable of sliding contact with the brake actuating surface 440. Thus, it will be appreciated that as the brake lever 420 moves toward the handlebar 414, the piston 426 moves into the first fluid cavity region 424 causing the first seal 428 to sealingly engage the wall of the first fluid cavity region 424, thereby blocking the fluid flow between the first and second fluid cavity regions 424, 432. This blockage builds pressure in the first fluid cavity region 424, and in turn, forces pressurized fluid through a central fluid bore 447 disposed through the piston 426, from a lower end of the piston 426 to an outlet port 446 defined at the upper end of the piston 426. In the illustrated example, the outlet port 446 is provided as a fitting that is mounted into the upper end of the piston 426 so that the fluid passes through the outlet fitting 446 and into the hydraulic line 418. Manual force applied to the brake lever 420 causes the piston 426 to be urged into the first fluid cavity region 424, thus providing the fluid pressure through the outlet fitting 446 and into the hydraulic line 418 to the brake or other device that is being hydraulically actuated. When manual pressure is released from the brake lever 420 the biasing force from the return spring 436 will cause the lever 420 to return to its rest position as shown in FIG. 7, wherein the first seal 428 is in non-sealing disengagement between the fluid cavity wall 427 and the piston 426 with the piston 426 in the open fluid circuit position to permit fluid flow between the first and second fluid cavity regions 424, 432.

FIG. 7 also shows the brake lever 420 utilized in connection with another component mounted to the housing 412 such as for example an optional shift actuation mechanism 450. A shift actuation mechanism 450 in this example is used to shift gears in the bicycle and is mounted partially inside the housing 412. In one example, the shift actuation mechanism may be a control mechanism such as that described in U.S. Pat. No. 7,779,718, the disclosure of which is hereby incorporated by reference in its entirety. The shift actuation mechanism 450 includes a shift lever 452 that pivots about a pivot pin 456 to accommodate pivoting of the brake lever 420. The shift lever 452 also pivots about a shift axis 454 to effect shifting. A step 460 is provided on the housing 412 to limit the travel range of the brake lever 420 in the outward direction.

The embodiment in FIG. 7 depicts a fluid cavity 423 that is provided inside a pivoting brake lever 420 and a piston 426 that is moveably disposed in the cavity 423 such that actuation of the brake lever 420 causes one end 442 of the piston 426 to contact a portion 440 of an adjacent housing 412 to move the piston 426 in a first fluid cavity region 424 of the fluid cavity 423 and thereby apply pressure to the brake fluid in the first fluid cavity region 424. Further, an outlet 446 is provided through the brake lever 420 itself to permit brake fluid to flow from the first fluid cavity region 424 outwardly into a hydraulic line 418.

Although several embodiments are described with respect to the drawings, it will be understood that more embodiments are possible. For example, the shift actuation mechanisms 50 and 150 are substitutable with each other for any other shift actuation mechanisms such as 250, 350 and 450 or any other handlebar mounted shift actuation mechanism. Moreover, the additional component may omitted entirely, or may be any component other than a shift actuation mechanism in some embodiments, such as for example a light control switch, a horn or signalling device, a suspension adjustment actuator or any other accessory or other component. Further additional components beyond just one may be part of or affixed to the housings 18, 118, 218, 318, 418.

Also various features described in some embodiments but not described in others, including by way of example only, including the fluid reservoirs 32, 132, 332, and/or 432, the adjustment screw 270, the link 370 and other features described herein can be varied and applied to any other embodiments.

Further although the examples shown herein are depicted in a vertical orientation mounted to a generally vertical portion of a handlebar such as a drop style handlebar, this is for example only and various embodiments may be mounted in other orientations or to other types of handlebars.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A control assembly mountable to a handlebar, the control assembly comprising:
   a housing mountable to the handlebar; and
   a brake actuation mechanism including a brake lever pivotally connected to the housing and defining a fluid cavity therein such that the fluid cavity pivots with the lever relative to the housing.

2. A control assembly according to claim 1, wherein the housing includes an additional component.

3. A control assembly according to claim 2, wherein the additional component includes a shift actuation mechanism.

4. A control assembly according to claim 1, wherein the brake actuation mechanism includes a piston mounted to extend into the fluid cavity.

5. A control assembly according to claim 4, wherein the piston is movably mounted inside the brake lever and configured for movement with respect to the brake lever and also for movement with respect to the housing.

6. A control assembly according to claim 5, wherein the fluid cavity includes a fluid cavity wall and first and second fluid cavity regions and the piston includes a first end portion disposed in the first fluid cavity region and a second end portion disposed in the second fluid cavity region, the piston sealingly engaging the fluid cavity wall to sealingly separate the first and second fluid cavity regions.

7. The control assembly according to claim 6, wherein the brake actuation mechanism includes an O-ring seal between the piston and the fluid cavity wall to sealingly separate the first and second fluid cavity regions.

8. The control assembly according to claim 6, wherein the fluid cavity is filled with brake fluid, and wherein pivotal movement of the brake lever with respect to the housing causes a rotational movement of both the fluid cavity and the piston with respect to the housing, and further causes fluid-compressive movement of the piston with respect to the first fluid cavity region.

9. The control assembly according to claim 1, wherein the brake actuation mechanism includes an outlet port disposed on the brake lever in fluid communication with the fluid cavity.

10. The control assembly according to claim 9, wherein the outlet port is in fluid communication with a hydraulic line.

11. The control assembly according to claim 1, wherein the brake actuation mechanism includes an outlet port disposed on the piston in fluid communication with the fluid cavity.

12. The control assembly according to claim 11, wherein the outlet port is in fluid communication with a hydraulic line.

13. The control assembly according to claim 1, wherein the brake actuation mechanism includes a piston mounted to extend into the fluid cavity and the housing includes a first interior surface, the piston having an end contacting the first interior surface to cause fluid-compressive movement of the piston with respect to the fluid cavity when the brake lever is actuated.

14. The control assembly according to claim 1, further comprising a shift actuation mechanism, the brake actuation mechanism including a piston mounted to extend into the fluid cavity, the shift actuation mechanism including a first interior surface, the piston having an end contacting the first interior surface to cause fluid-compressive movement of the piston with respect to the fluid cavity when the brake lever is actuated.

15. The control assembly according to claim 1, wherein the brake actuation mechanism includes a piston mounted to extend into the fluid cavity and the housing includes an adjustable threaded member, the piston having an end contacting the adjustable threaded member to cause fluid-compressive movement of the piston with respect to the fluid cavity when the brake lever is actuated.

16. The control assembly according to claim 1, wherein the brake actuation mechanism includes a piston mounted to extend into the fluid cavity and a link connected to the housing and to the piston, whereby the piston is connected by the link to the housing to cause fluid-compressive movement of the piston with respect to the fluid cavity when the brake lever is actuated.

17. The control assembly according to claim 1, further comprising a shift actuation mechanism, the brake actuation mechanism including a piston mounted to extend into the fluid cavity and a link connected to the shift actuation mechanism and to the piston, whereby the piston is connected by the link to the shift actuation mechanism to cause fluid-compressive movement of the piston with respect to the fluid cavity when the brake lever is actuated.

18. A control assembly mountable to a handlebar, the brake control assembly comprising:

actuating means for actuating a brake;

fluid compressing means for compressing fluid disposed inside the actuating means; and mounting means for mounting the actuating means and the fluid compressing means to the handlebar for movement of the actuating means and the fluid compressing means together relative to the handlebar.

19. The control assembly according to claim 16, wherein the fluid compressing means includes a piston mounted to extend into a fluid cavity, the fluid cavity disposed inside the actuating means.

\* \* \* \* \*